(12) United States Patent
Valentini et al.

(10) Patent No.: US 7,806,969 B2
(45) Date of Patent: Oct. 5, 2010

(54) BLACK INKJET INK

(75) Inventors: Jose Esteban Valentini, West Chester, PA (US); Kuo Hsiung Kung, Wilmington, DE (US); James A. Silver, Kennett Square, PA (US); William Thomas Hall, Hockessin, DE (US)

(73) Assignee: E.I. du Pont de Nemours and Company, Wilmington, DE (US)

( * ) Notice: Subject to any disclaimer, the term of this patent is extended or adjusted under 35 U.S.C. 154(b) by 0 days.

(21) Appl. No.: 12/511,574

(22) Filed: Jul. 29, 2009

(65) Prior Publication Data

US 2010/0024682 A1    Feb. 4, 2010

Related U.S. Application Data

(60) Provisional application No. 61/137,341, filed on Jul. 30, 2008.

(51) Int. Cl.
    *C09D 11/02* (2006.01)
(52) U.S. Cl. .................................................. 106/31.27
(58) Field of Classification Search ............... 106/31.27
    See application file for complete search history.

(56) References Cited

U.S. PATENT DOCUMENTS 7,291,212 B2 *   11/2007   Taguchi .................... 106/31.43

* cited by examiner

*Primary Examiner*—Jerry Lorengo
*Assistant Examiner*—Veronica Faison Gee
(74) *Attorney, Agent, or Firm*—Simon L. Xu; Angela J. Grayson

(57) ABSTRACT

The present invention pertains to an aqueous-based black inkjet ink comprising a mixture of Direct Black 168, Acid Blue 290 and a certain magenta dye. The ink exhibits good color neutrality and gray scale.

7 Claims, No Drawings

BLACK INKJET INK

CROSS REFERENCE TO RELATED APPLICATIONS

This application claims the benefit of U.S. Provisional Application Ser. No. 61/137,341 filed on Jul. 30, 2008.

BACKGROUND OF THE INVENTION

The present invention pertains to a black inkjet ink and in particular to an aqueous black inkjet ink comprising a mixture of certain dye colorants.

Inkjet printing is a non-impact printing process in which droplets of ink are deposited on a substrate, such as paper, to form the desired image. Inkjet printers are equipped with an ink set which, for full color printing, typically comprises a cyan, magenta and yellow ink (CMY). An ink set also commonly comprises a black ink (CMYK). Colorants for the inks can be soluble in the ink vehicle (dyes) or insoluble (pigments).

It is often desirable to print "black and white" images using only black ink. These images employ a range of shades between black and white are known as gray scale. Generally, black inks having a higher optical density are capable of producing more intermediate gray shades resulting in higher quality images. A large gray scale is particularly needed when producing complex images, such as photographs, having same or comparable quality as from other imaging techniques.

For high quality complex images, the black color should be as neutral as possible. Often, black colorants are not entirely neutral and have a slightly colored hue. However, because the human eye is less sensitive than a spectrophotometer, black ink may have a certain amount of hue and still appear neutral to an observer. For black inks with a significant hue, the non-black color becomes increasingly more apparent at each lighter shade of gray. Also, the hue can shift at incremental shades in some instances. The existence and shifting of hue contribute to reduced image quality.

U.S. Pat. No. 6,503,308 discloses black inkjet ink compositions with a mixture of pacified Reactive Black 31 (RB31) and Direct Black 168 (DB168).

U.S. Patent Application Publication No. 2007/0296786 discloses a black inkjet ink composition that includes an azo metal complex dye and a second dye wherein the second dye is at least one of Acid Blue 9 (AB9), Direct Blue 86 (DB86), Direct Blue 199 (DB199), Reactive Red 23 (RR23), Acid Red 52 (AR52), Direct Red 75 (DR75), Direct Violet 107 (DV107), Reactive Red 180 (RR180), Reactive Red 195 (RR195), Direct Red 227 (DR227) and Acid Red 289 (AR289).

U.S. Patent Application Pub. No. 2008/0107819 discloses an ink-jet ink comprising a black dye and a yellow dye.

While inkjet ink compositions with various mixtures of dye colorants have been proposed to address color neutrality and gray scale, a need still exists for alternative colorants with better color neutrality and gray scale. The present invention satisfies this need by providing compositions having improved color neutrality and gray scale.

SUMMARY OF THE INVENTION

An embodiment of the invention provides a black inkjet ink comprising an aqueous vehicle and a colorant, said colorant comprising Direct Black 168 (DB168), Acid Blue 290 (AB290), and a magenta dye selected from the group consisting of Irgasperse® Jet Magenta 3BL, Acid Red 82 (AR82), Reactive Red 23 (RR23) and mixtures thereof.

Another embodiment provides that the magenta dye is Irgasperse® Jet Magenta 3BL.

Another embodiment provides that the magenta dye is AR82.

Another embodiment provides that the magenta dye is RR23.

Another embodiment provides that the weight ratio of AB290 to DB168 is between 0.04 and 0.40.

Another embodiment provides that the weight ratio of the magenta dye to DB168 is between 0.02 and 0.30.

Another embodiment provides that the weight ratio of the total of AB290 combined with the magenta dye to DB168 is less than 0.50.

Another embodiment provides that the cumulative total of DB168, AB290 and the magenta dye is in the range of 1% to 8% by weight, based on the total weight of ink.

Yet another embodiment provides that the Irgasperse® Jet Magenta 3BL comprises at least one compound of Formula 1, as follows, and optionally any water-soluble salt form thereof:

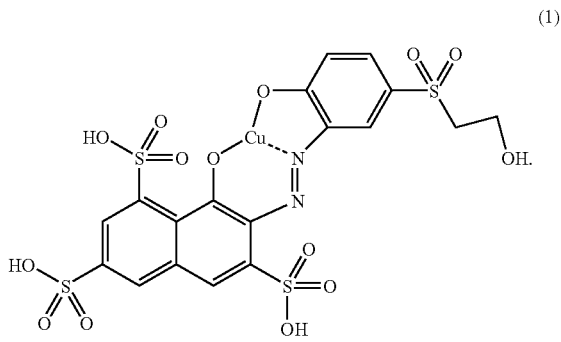

(1)

The dye names and abbreviations used herein are the "C.I." designation for pigments established by Society of Dyers and Colourists, Bradford, Yorkshire, UK and published in *The Color Index*, Third Edition, 1971.

These and other features and advantages of the present invention will be more readily understood by those of ordinary skill in the art from a reading of the following Detailed Description. Certain features of the invention which are, for clarity, described above and below as a separate embodiment, may also be provided in combination in a single embodiment. Conversely, various features of the invention that are described in the context of a single embodiment, may also be provided separately or in any subcombination.

DETAILED DESCRIPTION

Unless otherwise stated or defined, all technical and scientific terms used herein have commonly understood meanings by one of ordinary skill in the art to which this invention pertains.

Unless stated otherwise, all percentages, parts, ratios, etc., are by weight.

When an amount, concentration, or other value or parameter is given as either a range, preferred range or a list of upper preferable values and lower preferable values, this is to be understood as specifically disclosing all ranges formed from any pair of any upper range limit or preferred value and any lower range limit or preferred value, regardless of whether ranges are separately disclosed. Where a range of numerical values is recited herein, unless otherwise stated, the range is intended to include the endpoints thereof, and all integers and fractions within the range.

When the term "about" is used in describing a value or an end-point of a range, the disclosure should be understood to include the specific value or end-point referred to.

As used herein, the term "aqueous vehicle" refers to water or a mixture of water and at least one water-soluble organic solvent (co-solvent).

As used herein, the term "water-soluble salt" means a salt having a solubility of greater than 20 grams of the salt in 100 grams of water at 20° C.

As used herein, the terms "Trizma" and "Tris" mean tris (hydroxymethyl)-aminomethane.

As used herein, the term "mPa·s" means millipascal second, a viscosity unit.

As used herein, the term "mN.m$^{-1}$" means milliNewtons per meter, a surface tension unit.

As used herein, the term "EDTA" means ethylenediaminetetraacetic acid.

As used herein, the term "IDA" means iminodiacetic acid.

As used herein, the term "EDDHA" means ethylenediamine-di(o-hydroxyphenylacetic acid).

As used herein, the term "NTA" means nitrilotriacetic acid.

As used herein, the term "DHEG" means dihydroxyethylglycine.

As used herein, the term "CyDTA" means trans-1,2-cyclohexanediaminetetraacetic acid.

As used herein, the term "DTPA" means diethylenetriamine-N,N,N',N'',N''-pentaacetic acid.

As used herein, the term "GEDTA" means glycoletherdiamine-N,N,N',N'-tetraacetic acid.

As used herein, Surfynol® 465 is a surfactant commercially available from Air Products (Allentown, Pa., U.S.A.).

As used herein, Neodol® is a surfactant commercially available from Shell (Houston, Tex., U.S.A.).

As used herein, Tergitol® is a surfactant commercially available from Union Carbide (Houston, Tex., U.S.A.).

As used herein, Silwet® was a surfactant commercially available from Witco Corporation (no longer in existence).

As used herein, Zonyl® is a surfactant commercially available from DuPont (Wilmington, Del., U.S.A.).

As used herein, Aerosol® OT is a surfactant from Cytec Industries (West Paterson, N.J., U.S.A.).

As used herein, Tomadol® 45-7 is a surfactant from Tomah Products, Inc. (Milton, Wis., U.S.A.)

As used herein, Dowfax™ 8390 is a surfactant from The Dow Chemical Company (Great Lakes, Mich., U.S.A.)

Unless otherwise noted, the above chemicals were obtained from Aldrich (Milwaukee, Wis., U.S.A.) or other similar suppliers of laboratory chemicals.

The materials, methods, and examples herein are illustrative only except as explicitly stated, and are not intended to be limiting.

In addition, references in the singular may also include the plural (for example, "a" and "an" may refer to one, or one or more) unless the context specifically states otherwise.

Colorant

Acid Blue 290 (AB290) was obtained from DyStar Textilfarben GmbH, Frankfurt, Del. Acid Red 82 (AR82) was obtained from Lanxess, Pittsburgh, Pa., U.S.A. Direct Black 168 (DB168), Reactive Red 23 (RR23) and Reactive Black 31 (RB31) were obtained from Clariant, Muttenz, CH. Direct Blue 199 (DB199) and Acid Red 52 (AR52) were obtained from Sensient Technologies Corporation, Milwaukee, Wis, U.S.A. Irgasperse® Jet Magenta 3BL (for convenience, "Magenta 3BL") was obtained from Ciba Specialty Chemicals Basel, CH. Although the chemical structure of Irgasperse® Jet Magenta 3BL is not disclosed by the manufacturer, analysis indicates that Irgasperse® Jet Magenta 3BL is a copper-azo complex dye, the acid form of which is represented by Formula 1 below:

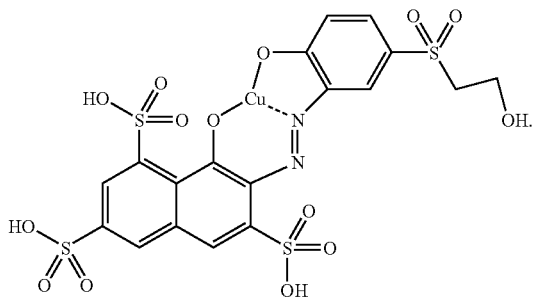

(1)

All the prescribed dyes are anionic dyes which are generally present in an ink as a salt which includes, for example, Li, Na, K, (alkyl)ammonium salts and mixtures thereof.

The cumulative total of DB168, AB290 and magenta dye in the ink is typically in the range of about 0.1% to about 10%; specifically in the range of about 1% to 8%, based on the total weight of the ink.

Typically, the weight ratio of AB290 to DB168 is between 0.04 and 0.40, and the weight ratio of magenta colorant to DB168 is between 0.02 and 0.30. Typically, the weight ratio of the total of AB290 combined with the magenta dye to DB168 is less than 0.50.

In any of the various embodiments of the present invention, the prescribed magenta dye can be any single member of the group of named dye species, or the prescribed magenta dye can be any two-way combination of members of the group of named dye species, or the prescribed magenta dye can be a combination of all three members of the group of named dye species.

Vehicle

Selection of a suitable aqueous vehicle mixture depends on requirements of the specific application, such as the desired surface tension and viscosity, the selected colorant, drying time of the ink, and the type of substrate onto which the ink will be printed. Representative examples of water-soluble organic solvents which may be utilized in the present invention are those that are disclosed in U.S. Pat. No. 5,085,698.

If a mixture of water and a water-soluble solvent is used, the aqueous vehicle typically will contain about 50% to about 97% of water with the remaining balance (i.e., about 50% to about 3%) being the water-soluble solvent. Compositions of the present invention may contain about 60% to about 97% of water, based on the total weight of the aqueous vehicle.

The amount of aqueous vehicle in the ink is typically in the range of about 70% to about 99.8%; specifically about 80% to about 99.8%, based on total weight of the ink.

The aqueous vehicle can be made to be fast penetrating (rapid drying) by including surfactants or penetrating agents such as glycol ether(s) or 1,2-alkanediols. Suitable surfactants include ethoxylated acetylene diols (e.g., Surfynols® series commercially available from Air Products), ethoxylated primary (e.g., Neodol® series commercially available from Shell) and secondary (e.g., Tergitol® series commercially available from Union Carbide) alcohols, sulfosuccinates (e.g., Aerosol® series from Cytec), organosilicones (e.g., Silwet® series from Witco) and fluoro surfactants (e.g., Zonyl® series commercially available from DuPont).

The amount of glycol ether(s) or 1,2-alkanediol(s) added must be properly determined, but is typically in a range of from about 1% to about 15% by weight, and more typically about 2% to about 10% by weight, based on the total weight of the ink.

Additives

Other ingredients, additives, may be formulated into the inkjet ink, to the extent that such other ingredients do not interfere with the stability and jetability of the inkjet ink. This may be readily determined by routine experimentation by one skilled in the art.

Surfactants are commonly added to inks to adjust surface tension and wetting properties. Suitable surfactants include the ones disclosed in the "Vehicle" section above. Surfactants are typically used in amounts up to about 5% and more typically in amounts up to 2% by weight, based on the total weight of the ink.

Inclusion of sequestering (or chelating) agents such as ethylenediaminetetraacetic acid (EDTA), iminodiacetic acid (IDA), ethylenediamine-di(o-hydroxyphenylacetic acid) (EDDHA), nitrilotriacetic acid (NTA), dihydroxyethylglycine (DHEG), trans-1,2-cyclohexanediaminetetraacetic acid (CyDTA), diethylenetriamine-N,N,N',N'',N''-pentaacetic acid (DTPA), and glycoletherdiamine-N,N,N',N'-tetraacetic acid (GEDTA), and salts thereof, may be advantageous, for example, to eliminate deleterious effects of heavy metal impurities.

Polymers may be added to the ink to improve durability. The polymers can be soluble in the vehicle or dispersed (e.g. "emulsion polymer" or "latex"), and can be ionic or nonionic. Useful classes of polymers include acrylics, styrene-acrylics and polyurethanes.

When a soluble polymer is present, the polymer level is typically between about 0.01% and about 3% by weight, based on the total weight of an ink. The upper limit is dictated by ink viscosity or other physical limitations.

Biocides may be used to inhibit growth of microorganisms. Buffers may be used to maintain pH. Buffers include, for example, tris(hydroxymethyl)-aminomethane ("Trizma" or "Tris").

Proportions of Ingredients

The components described above can be combined to make an ink in various proportions and combinations in order to achieve the desired ink properties. Some experimentation may be necessary to optimize an ink for a particular end use, but such optimization is within the ability of one of ordinary skill in the art.

The amount of vehicle in an ink is typically in the range of from about 70% to about 99.8%, and more specifically from about 80% to about 99% by weight, based on the total weight of the ink. The levels of colorant employed in formulated inks are those levels needed to impart the desired optical density to the printed image. As noted previously, the amount of colorant present is typically in the range of about 0.1 to about 10%, and more typically in the range of about 1% to about 8% by weight, based on the total weight of the ink.

Additives, when present, generally comprise less than about 15% by weight, based on the total weight of the ink. Surfactants, when added, are generally in the range of about 0.1% to about 3% by weight based on the total weight of the ink. Polymers can be added as needed, but will generally be less than about 5% by weight based on the total weight of the ink.

Ink Properties

Jet velocity, separation length of the droplets, drop size and stream stability are greatly affected by the surface tension and the viscosity of the ink. Ink jet inks typically have a surface tension in the range of about 20 mN.m$^{-1}$ to about 50 mN.m$^{-1}$ at 25° C. Viscosity can be as high as 30 mPa·s at 25° C., but is typically in the range of about 1 mPa·s to about 20 mPa·s at 25° C. The ink has physical properties compatible with a wide range of the ejecting conditions and printhead design. The ink should have excellent storage stability for long periods so as not to clog to a significant extent in an inkjet apparatus.

Furthermore, the ink should not corrode parts of the inkjet printing device it comes in contact with, and it should be essentially odorless and non-toxic.

Preferred pH for the ink is in the range of from about 6 to about 8.

The inks of the present invention can be printed with any suitable inkjet printer including printers equipped with "piezo" and "thermal" printheads. The substrate can be any suitable substrate including paper such as "plain" paper, inkjet specialty and glossy paper.

The following examples illustrate the invention without, however, being limited thereto.

EXAMPLES

The dyes used in the following examples were "inkjet grade" meaning that they were relatively pure and free of extraneous salts. If necessary, the "as received" samples were further purified prior to use. Water used was deionized water.

Comparative Inks A-F were prepared according to formulations in Table 1 below. Ingredients, given as weight percent of the total weight of ink, were mixed together and filtered. Ink A is a comparative ink containing black dye DB168 as the only colorant. Inks B and C are comparative inks with different combinations of DB168 and RB31 as colorants. They were prepared according to disclosure in U.S. Pat. No. 6,503,308. Ink D is a comparative ink using DB199 as a cyan dye. Ink E is a comparative ink using AR52 as a magenta dye. Ink F is a comparative ink using both DB199 and AR52 to replace AB290 and AR52 in Ink E.

TABLE 1

| Ingredients | Ink A | Ink B | Ink C | Ink D | Ink E | Ink F |
|---|---|---|---|---|---|---|
| DB168* | 2.90 | 2.08 | 1.70 | 2.08 | 2.08 | 2.08 |
| RB31* | — | 0.52 | 1.13 | — | — | — |
| DB199* | — | — | — | 0.42 | — | 0.44 |
| AR52* | — | — | — | — | 0.08 | 0.28 |
| AR82* | — | — | — | 0.28 | — | — |
| AB290* | — | — | — | — | 0.42 | — |
| 2-Pyrrolidone* | 6.0 | 7.0 | 7.0 | 7.0 | 12.0 | 7.0 |
| 1,6-Hexanediol* | 11.0 | 12.0 | 12.0 | 12.0 | — | 12.0 |
| Aerosol ® OT* | 0.25 | 0.20 | 0.20 | 0.20 | — | 0.20 |
| 1,5-Pentanediol* | — | — | — | — | 6.0 | — |
| Tomadol ® 45-7* | — | — | — | — | 0.90 | — |
| Dowfax ™ 8390* | — | — | — | — | 0.5 | — |
| Water Added | Balance to 100% | Balance to 100% | Balance to 100% | Balance to 100% | Balance to 100% | Balance to 100% |

*as % by weight based on total weight of ink

Inventive Inks 1-6 were prepared according to formulations in Table 2 below. Ingredients, given as weight percent of the total weight of ink, were mixed together and filtered.

TABLE 2

| Ingredients | Ink 1 | Ink 2 | Ink 3 | Ink 4 | Ink 5 | Ink 6 |
|---|---|---|---|---|---|---|
| DB168* | 2.70 | 2.70 | 2.08 | 2.08 | 2.08 | 2.08 |
| Magenta 3BL* | 0.28 | 0.2 | 0.2 | — | — | — |
| AR82* | — | — | — | 0.28 | 0.28 | — |
| RR23* | — | — | — | — | — | 0.28 |
| AB290* | 0.29 | 0.54 | 0.42 | 0.44 | 0.42 | 0.42 |
| AR52* | — | — | — | — | — | — |
| 2-Pyrrolidone* | 12.0 | 12.0 | 12.0 | 12.0 | 7.0 | 12.0 |
| 1,6- | — | — | — | — | 12 | — |

TABLE 2-continued

| Ingredients | Ink 1 | Ink 2 | Ink 3 | Ink 4 | Ink 5 | Ink 6 |
|---|---|---|---|---|---|---|
| Hexanediol* 1,5- | 6.0 | 6.0 | 6.0 | 6.0 | — | 6.0 |
| Pentanediol* Trimethylol-propane* | 8.0 | 8.0 | 8.0 | 8.0 | — | 8.0 |
| Tomadol ® 45-7* | 0.9 | 0.9 | 0.9 | 0.9 | — | 0.9 |
| Dowfax ™ 8390* | 0.5 | 0.5 | 0.5 | 0.5 | — | 0.5 |
| Aerosol ® OT* | — | — | — | — | 0.20 | — |
| Water Added | Balance to 100% | Balance to 100% | Balance to 100% | Balance to 100% | Balance to 100% | Balance to 100% |

*as % by weight based on total weight of ink

Each of the various inks were printed on HP Glossy Paper using a Canon 560 B Printer. Printing was done in the selected "High Quality" print mode that targets 100%, 50% and 33% area fills. The area fill, or coverage, that an inkjet printer puts down on a substrate is usually controlled by the printer software and can be set in the printer settings. For example, a setting for 50% area fill means that the inkjet printer is to fire enough droplets/dots to cover at least 50% of the area being printed. For the 100% area fill, an inkjet printer is to fire enough droplets/dots to cover at least 100% of the area being printed which usually results in dots spreading and partially overlapping with each other. Inks were printed from the yellow cartridge slot to prevent color underprint.

Color measurements were made with a commercially available spectrophotometer, in this case a Spectroeye from Gretag-MacBeth. Color values are based on CIELAB colorspace $L^*$, $a^*$ and $b^*$ terms. The measurements and definitions are well known in the art, see: for example, *ASTM Standard E308*, published by American Society for Testing and Materials (ASTM) International, and *Principles of Color Technology*, Billmeyer and Saltzman, 3rd Ed., Roy Berns editor, John Wiley & Sons, Inc. (2000).

Color neutrality was assessed relative to the $a^*$ and $b^*$ values wherein zero indicates an absolutely neutral black color. The $a^*$ axis represents the amount of blue and yellow hues in the black color. Positive values indicate increasing yellow hues, and negative values indicate increasing blue hues. The $b^*$ axis represents the amount of red and green hues in the black color. Positive values indicate increasing red hues, and negative values indicate increasing green hues. The $L^*$ axis (not given) measures the optical density. Preferably, the $a^*$ and $b^*$ values are as close to zero as possible. Preferably the variation in $a^*$ or $b^*$ values over the full range of area fills is less than two units, and more preferably less than one unit.

Print results are summarized in Table 3 below. The terms $a^*@100$, $a^*@50$, and $a^*@33$ refer to the $a^*$ value of each ink at each area fill (100%, 50% and 33%). Similarly, the terms $b^*@100$, $b^*@50$, and $b^*@33$ refer to the $b^*$ value of each ink at each area fill (100%, 50% and 33%). The term $\Delta a^*$ is the absolute value of the difference in $a^*$ value between $a^*@100$ and $a^*@33$. Similarly, the term $\Delta b^*$ is the absolute value of the difference in $b^*$ value between $b^*@100$ and $b^*@33$.

TABLE 3

| Ink | a*@100 | a*@50 | a*@33 | (Δa*) | b*@100 | b*@50 | b*@33 | (Δb*) |
|---|---|---|---|---|---|---|---|---|
| | | | | (L* a* b* unit) | | | | |
| Ink 1 | −2.4 | −2.5 | −2.5 | (0.1) | −7.7 | −7.7 | −7.9 | (0.2) |
| Ink 2 | −3.5 | −3.3 | −3 | (0.5) | −8 | −7.8 | −7.6 | (0.4) |
| Ink 3 | −3.0 | −2.9 | −2.7 | (0.3) | −8.3 | −8.1 | −7.8 | (0.5) |
| Ink 4 | −2.1 | −1.8 | −1.7 | (0.4) | −8.6 | −8.2 | −8.3 | (0.3) |
| Ink 5 | −3.0 | −2.1 | −1.8 | (1.2) | −6.6 | −4.8 | −5.0 | (1.0) |
| Ink 6 | −3.2 | −2.7 | −2.7 | (0.5) | −7.0 | −6.9 | −5.9 | (1.1) |
| Ink A | −3.7 | −2.9 | −2.3 | (1.4) | −5.1 | −6.1 | −7.2 | (2.1) |
| Ink B | −3.0 | −2.3 | −2.0 | (1.0) | −5.2 | −6.3 | −6.6 | (1.4) |
| Ink C | −1.3 | −1.2 | −1.2 | (0.1) | −4.4 | −5.6 | −6.4 | (2.0) |
| Ink D | −4.8 | −3.5 | −2.9 | (1.9) | −8.4 | −6.3 | −5.7 | (2.7) |
| Ink E | −3.3 | −2.7 | −2.7 | (0.6) | −7.4 | −6 | −5.6 | (1.8) |
| Ink F | 2.7 | 1.0 | 0.5 | (2.2) | −18 | −14 | −13.0 | (5.0) |

As shown in Table 3, the inventive Inks 1-5 show good color neutrality with small absolute $a^*$ and $b^*$ values. Also, the inventive Inks 1-5 show very little hue shift (small $\Delta a^*$ and $\Delta b^*$) at different densities (between 100% and 33%, 100% and 50%, and 50% and 33% area fills). These good properties make the inks quite advantageous as black inks.

The results for comparative Ink A, containing black dye DB168 as the only colorant, illustrate the problem of significant hue shift when only this single colorant is used. The data show substantial hue shift (large absolute values of $\Delta a^*$ and $\Delta b^*$) between the lower and higher densities.

Comparative Inks B and C were disclosed in U.S. Pat. No. 6,503,308 as having superior gray scales. As can be seen, the hue shifts of Inks B and C are indeed less than that of Ink A. However, the inks of the present invention provide even better (less) hue shifts compared to both Ink B and Ink C.

Ink D is a comparative ink employing Direct Blue 199 as the cyan dye replacing Acid Blue 290 in Ink 5. As can be seen, Ink D is less neutral and exhibits larger hue shift compared to Ink 5 and the other inventive inks with the prescribed AB290. Although DB199 is a common dye used in inkjet inks, it is unsuitable as a substitute of AB290 in the present invention.

Ink E is a comparative ink employing Acid Red 52 as magenta dye replacing the magenta dye in Ink 3. As can be seen, there is less neutrality and more hue shift compared to Ink 3 and the other inventive inks with one of the prescribed magenta dyes. Although AR52 is a common magenta dye used in inkjet inks, it is unsuitable as a substitute of the prescribed magenta dyes in the present invention.

Ink F employs both DB199 and AR52 replacing AB290 and the specified magenta dye in Ink E. Again, there is less neutrality and more hue shift compared to the inks of the present invention.

What is claimed is:

1. A black inkjet ink comprising an aqueous vehicle and a colorant, said colorant comprising:
   a) Direct Black 168 (DB168),
   b) Acid Blue 290 (AB290), and
   c) a magenta dye comprising at least one compound of Formula 1, as follows, and optionally any water-soluble salt form thereof:

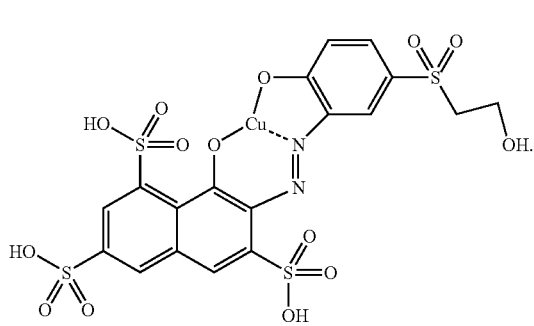

(1)

2. The ink of claim 1, wherein said magenta dye further comprises Acid Red 82 (AR82).

3. The ink of claim 1, wherein said magenta dye further comprises Reactive Red 23 (RR23).

4. The ink of claim 1, wherein the weight ratio of AB290 to DB168 is between 0.04 and 0.40.

5. The ink of claim 1, wherein the weight ratio of said magenta dye to DB168 is between 0.02 and 0.30.

6. The ink of claim 1, wherein the weight ratio of the total of AB290 combined with said magenta dye to DB168 is less than 0.50.

7. The ink of claim 1, wherein the cumulative total of DB 168, AB290 and said magenta dye is in the range of 1% to 8% by weight, based on the total weight of ink.

* * * * *